W. S. TOWNSEND.
PORTABLE LIQUID DISPENSER.
APPLICATION FILED AUG. 24, 1920.
1,390,476.
Patented Sept. 13, 1921.
3 SHEETS—SHEET 3.
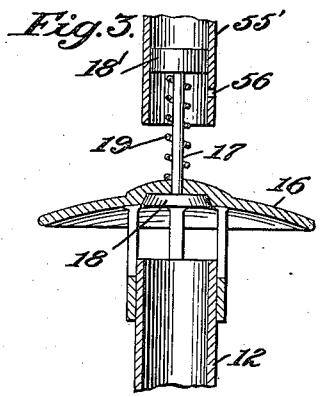
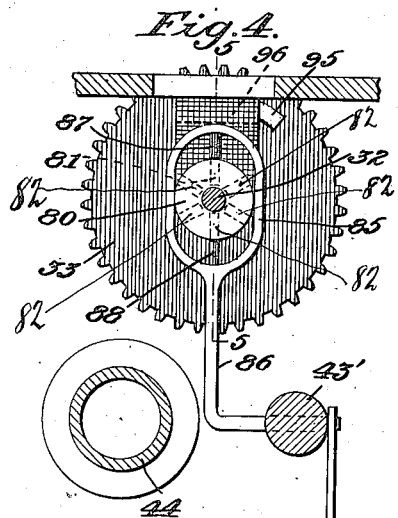
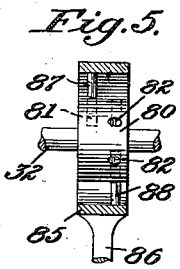
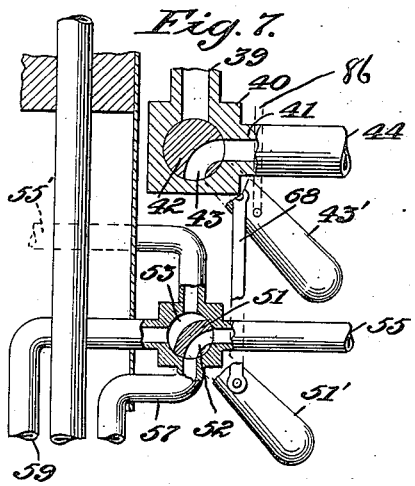
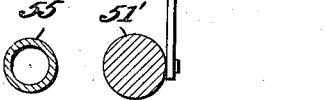
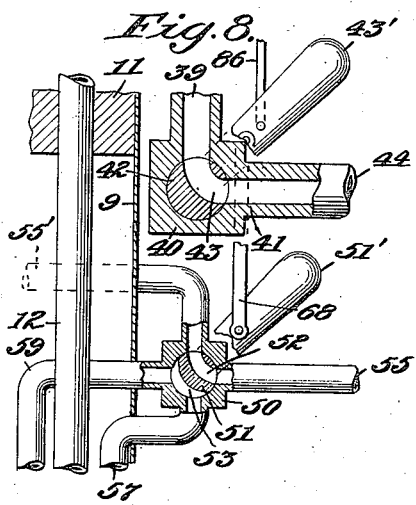
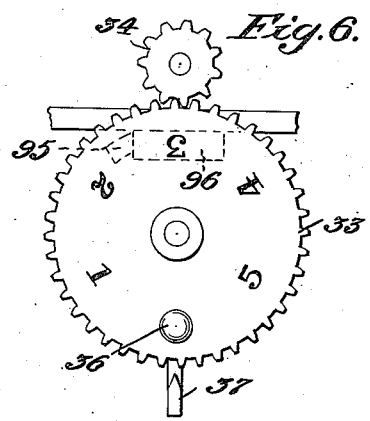
Inventor:
W. S. Townsend
by Geo. K. Evans
Att'y.

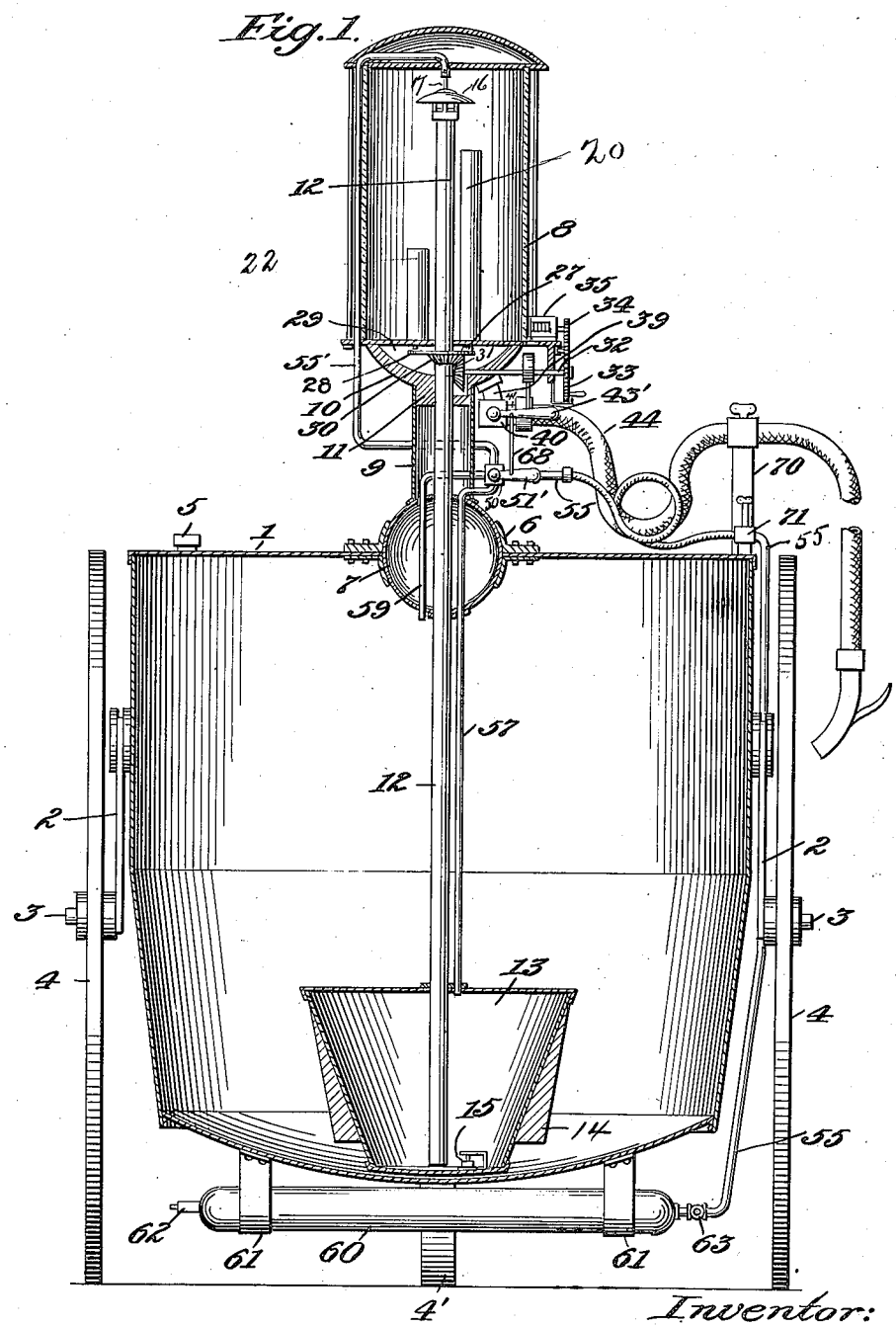

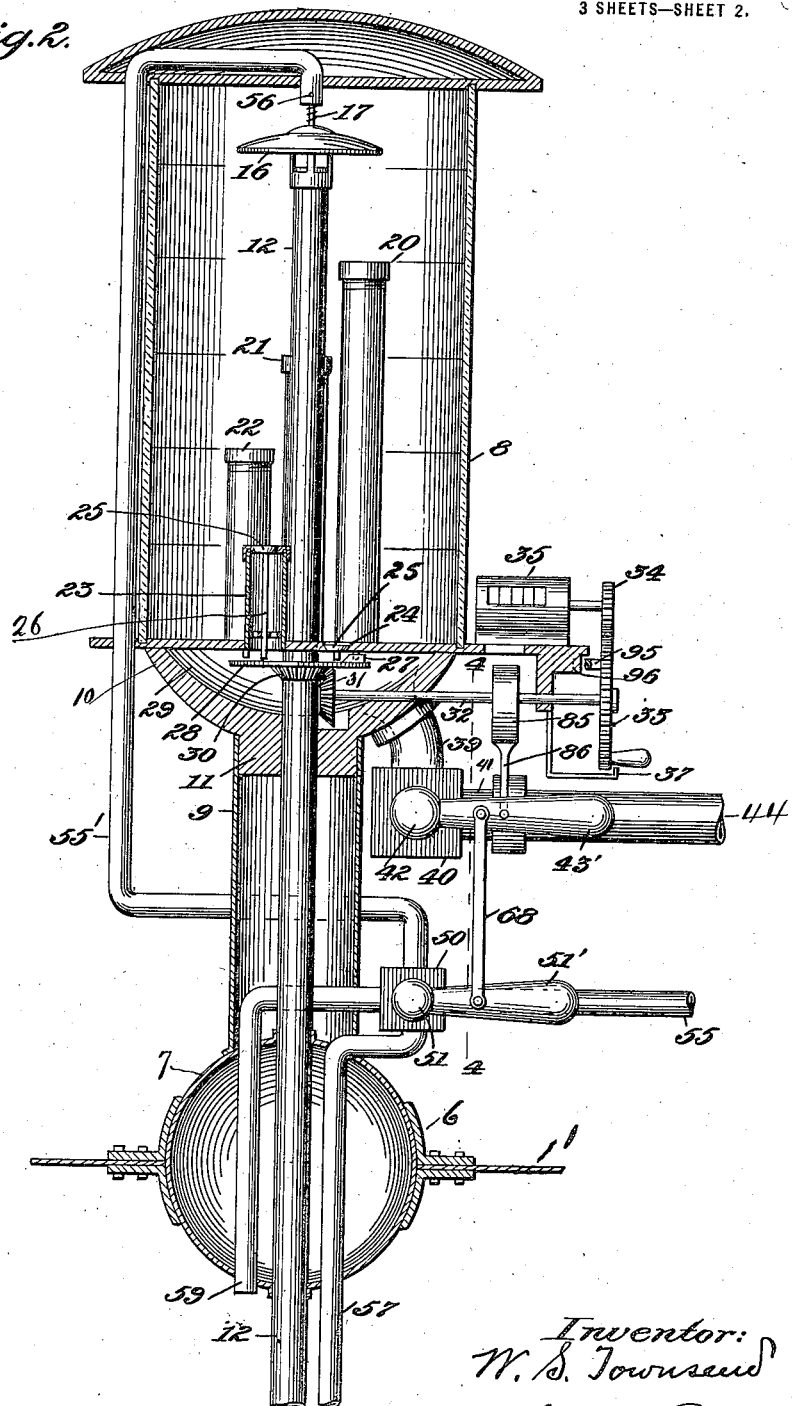

UNITED STATES PATENT OFFICE.

WILLIAM S. TOWNSEND, OF WASHINGTON, DISTRICT OF COLUMBIA.

PORTABLE LIQUID-DISPENSER.

1,390,476.  Specification of Letters Patent.  Patented Sept. 13, 1921.

Application filed August 24, 1920. Serial No. 405,732.

*To all whom it may concern:*

Be it known that I, WILLIAM S. TOWNSEND, a citizen of the United States, residing at Washington, in the District of Columbia, have invented certain new and useful Improvements in Portable Liquid-Dispensers, of which the following is a specification.

My invention relates primarily to liquid dispensing apparatus of the visible measure predetermined bulk type.

The objects of the invention are to provide a measuring vessel having a free universal connection with its supporting means so that the vessel will always assume a vertical position, regardless of the inclination of its supporting means; thereby assuring the horizontal alinement of the liquid in the vessel with the graduations thereon or with the upper ends of the measuring tube or tubes; also to provide a portable support upon which the visible or glass measuring vessel is supported for a free universal swinging movement; to provide a support in the form of a portable or wheeled main tank upon which the measuring vessel is supported to have a free universal swinging movement; to provide such freely swinging vessel with a depending weighted portion within the tank to bring the vessel quickly to a true vertical position, regardless of any inclination of the tank; to provide the inlet pipe of the measuring vessel within the tank with a supplemental measuring and counterbalancing vessel or sub-tank to receive a predetermined amount of liquid somewhat greater than the maximum of the predetermined quantity of which the visible measuring vessel is capable of measuring and discharging; to provide a compressed air supply leading to the auxiliary vessel to force therefrom the contained body of liquid and discharge it into the visible measuring vessel; to provide means for forcing the measured quantity of liquid from the visible container or vessel to the outlet or discharge hose; to provide means for relieving the measuring vessel of the pull or strain of the discharge hose; to simultaneously control the valve of this outlet and the valve in the compressed air pipe connecting the two measuring vessels; to provide a series of graduated valved outlets or outlets at different levels within the visible measure, the valves having depending stems extending below the bottom of the vessel in the path of a rotary cam for successive operation thereby; to provide a shaft geared to the cam for rotating it; said shaft having an operating graduated hand wheel coacting with a pointer; to provide a counter for the number of gallons discharged, actuated from said hand wheel; to provide means for locking the outlet valve to the graduated hand wheel shaft to prevent opening of the outlet valve until the counter operating shaft is also operated; to provide a portable or wheeled tank with a visible measuring vessel having a depending inlet pipe connected by a ball and socket joint with the cover of the tank and counterweighted at its lower end to hold the vessel in a vertical position, regardless of the inclination of the tank; to provide the upper outlet end of the vertical supply pipe with a valve to be closed by the compressed air entering the vessel to discharge its contents; also to provide means for relieving the tank of any strain from the filling hose; also to provide a flexible or looped connection between the compressed air supply pipe and its controlling valve carried by or connected to the measuring vessel.

These objects I accomplish by the construction shown in the accompanying drawings, in which:

Figure 1 is a transverse vertical section showing my improved portable dispensing apparatus.

Fig. 2 is a similar enlarged view with the main tank omitted.

Fig. 3 is a detail sectional view of the upper end of the liquid supply pipe and the overhanging end of the compressed air pipe.

Fig. 4 is a detail sectional view on line 4—4 of Fig. 2.

Fig. 5 is a section on line 5—5, Fig. 4.

Fig. 6 is a face view of the graduated pinion and the pinion of the odometer or counter.

Fig. 7 is a sectional side elevation of the connected discharge and air supply valves in one of their positions, and Fig. 8 is a like view with the parts in another position.

A storage tank 1 is provided above its center of gravity with depending side arms 2, 2, terminating at their lower ends in stub axles or trunnions 3, upon which the ground wheels 4 are mounted. A third wheel 4′ will also be provided at the front or near the tank 1.

The tank may, of course, be supported so as to be moved from place to place in any suitable manner. On its upper side the tank 1 is provided with any suitable form of vented filling cap 5 so that the tank may be filled from time to time.

The top of the tank is provided with a ball-socket 6 within which is mounted a ball or spherical mounting 7 to freely turn therein and form a universal joint. Upon the upper side of the ball 7 is mounted the glass measuring vessel or "visible container" 8, through the medium of a short tube or column 9; the base 10 of the measuring vessel having a depending neck 11 secured in the upper end of the tube 9. A filling tube 12 extends from the upper portion of the glass container 8, down through the tube 9 and ball 7 to the lower portion of the main tank 1, where it is provided with a sub-storage tank 13 rigid therewith and forming a pendulum or weight to hold the glass container or measuring vessel 8 always in a vertical position, regardless of whether the main tank is at an inclination or not.

This sub-tank 13 is supplemented by an added weight 14 to assist in holding the vessel 8 upright under all conditions. The bottom of the main tank 1 and sub-tank 13 are close together and curved on concentric lines. Thus substantially all of the liquid from the main tank will flow up through the bottom of the sub-tank 13, which is provided for this purpose with an upwardly opening inlet check valve 15. Violent motion of the pendulum forming weighted sub-tank is prevented by reason of the liquid in the main tank serving as a damper or dash pot.

The upper end of the supply pipe is provided with the usual shield or spreader 16 spaced thereabove, as shown in Fig. 3, and mounted in the center of the spreader is a valve stem 17 provided with a valve 18 to close down upon the upper end of the tube 12 under the action of compressed air upon its operating piston 18′, as will presently appear. Upward movement of the valve 18 is effected by a spiral spring 19 located between the piston 18 and the top of the spreader.

The measuring vessel 8 is of the predetermined volume type and is provided, say, with five outlets at different heights; the distance between each outlet from the highest downwardly representing one gallon. These outlets are in the present instance shown as vertical pipes or passages 20, 21, 22, 23 and 24; the distance from the upper end of supply pipe 12 to the top of the longest pipe or passage 20 being one gallon and so marked on the glass container. So the distance from the top of pipe 20 down to the top of 21 represents one gallon, and so on down to the outlet 24, which is in the bottom of container. All these outlets 20 to 24, inclusive, are provided with upwardly opening valves 25, the stems 26 of which extend down through the bottom of the container the same distance and into the path of a cam 27 on the upper side of a rotary plate 28 mounted to turn on the filling pipe 12 within the outlet chamber 29. The valve seats 25′ are vertically adjustable so as to regulate exactly the overflow point of the measuring tubes and a simple construction is to form the seats in caps which are threaded to the tubes as in Fig. 2. The lower side of the plate 28 is provided with a bevel gear 30 with which meshes a vertically disposed bevel gear 31 at the inner end of a horizontal shaft 32 extending exterior to the outlet chamber 29 and provided at its outer end with an indicating pinion 33 meshing with the pinion 34 of a "Veeder" or other suitable counter or odometer 35.

The pinion 33 is provided with numerals 1 to 5 and with a handle 36 at the neutral or zero point and a pointer 37 is arranged adjacent to the numbered face of the pinion 33.

From the bottom of the outlet chamber 29 leads a discharge pipe 39 and opening downwardly into a valve casing 40 having a nipple 41 at right angles to the passage 39. Within the valve casing 40 is a plug valve 42 having a curved passage 43 adapted to connect the discharge pipe 39 with the nipple 41 and hose 44 connected thereto, see Fig. 8. Below the valve 40 is a four-way air valve casing 50 provided with an opening at every one of its four sides all controlled from a plug cock 51 having two curved passages 52, 53 formed therein.

With the upper and outer passages of the valve casing 50 are connected compressed air supply pipes 55, 55′ leading from a compressed air tank 60 supported by straps 61 from the bottom of the main tank 1; said tank 60 having an ordinary filling valve 62 at one end and an ordinary reducing valve 63 at its outlet end. The pipe 55′, after leaving the valve 50, extends upwardly and enters the top of the measuring container 8, where its discharge end depends centrally over the hood 16 and receives within it the before described piston 18′ of the valve 18. The piston 18′ forms a valve controlling a port 56 in the pipe 55, as shown in Fig. 3.

From the lower side of valve casing 51 also leads a downwardly extending pipe 57 which, when the valve 51 is in the position shown in Fig. 7, permits the compressed air to flow from the compressed air tank 60 down into the sub-tank 13 and force its contents up into the measuring container 8; the pressure in the sub-tank 13 serving to close its inlet valve 15 until the contents of said sub-tank are evacuated. The sub-tank 13 is of somewhat greater capacity than the measuring capacity of the container 8 and the over-plus from the container will run back through the pipe 12. In order that proper venting of sub-tank 13 and measuring vessel 8 may be effected, I provide a pipe 59 leading from the rear wall of valve casing 50 down through the top of the main tank 1, which, as before stated, has a vented filling valve 5. In the venting positions valve 51 connects pipes 55' and 59 as in Fig. 7 and connects pipes 57 and 59 as in Fig. 8.

The handles 43' and 51' of valves 42 and 52 respectively are connected for simultaneous movement by a link 68.

In order that the container 8 may swing freely without interference from the filling hose 44, said hose is fixedly secured to a bracket 70 secured to the tank and provided between the bracket and the container with a looped portion as shown in Fig. 1 and the pipe 55 is also secured to a bracket 71 and provided with a flexible looped portion between the said bracket and the container. In this manner what may be said to be a flexible connection for these two pipes is formed and any strain on the two is borne by the brackets 70—71.

In order that the contents of the measuring vessel 8 may not be discharged without being counted, I provide the shaft 32 of the index wheel 33 with a locking disk 80 embraced by a yoke 85 at the upper end of rod 86 pivotally connected at its lower end to the valve handle 43'. The upper and lower ends of the yoke are provided with inwardly extending pins or studs 87—88 out of vertical alinement, see Fig. 5, and these pins coöperate respectively with a single hole 81 and five holes 82; the pin 87 entering the holes 81 when the yoke 85 is depressed and the pin 88 entering one of the holes 82 when the yoke is raised.

It is essential in the predetermined bulk variable discharge type of fluid dispensing tanks such as are used for dispensing gasolene primarily that the outlet or outlets lie in a strictly horizontal plane or planes, and this is the case, of course, with the stationary type of apparatus, but I am the first to provide a portable apparatus of this type including means for always keeping the measuring container vertical, no matter what the inclination of the movable support may be.

The operation is as follows: First, fill the tank 1 at the cap 5, whereupon the weight of the gasolene will raise check valve 15 and fill the sub-tank 13. Second, connect an ordinary air hose to the valve 62 and fill the tank 60 say to 100 pounds. The apparatus is now ready for operation and may be moved up to the car the tank of which is to be filled and the filling hose 44 connected therewith. The operator will now depress handle 43', which will open the valve 51 as in Fig. 7 and cause the compressed air to flow through valve passage 70 52 into pipe 57 and thence into sub-tank 13, forcing its contents up through filling pipe 12 into the measuring vessel 8. This action vents pipe 55' through passage 53 and pipe 59 into top of tank 1 and out through the vent in cap 5. Next, return handle 43' to its normal horizontal position which cuts off the air pressure and permits the surplus gasolene in vessel 8 to drain back into the sub-tank through pipe 12, and at the same time permitting sub-tank 13 to refill through valve 15. Should three gallons of gasolene be desired by the purchaser the operator will turn the wheel 33 until the numeral 3 registers with the pointer and this will cause the cam 27 to successively open the valves 25 in the tops of the tubes 20, 21 and 22 and make communication with the outlet chamber and outlet pipe 39. Next, raise handle 43', see Fig. 8, which will open valve 42. At the same time the valve 50 will through its passage 52 connect air pipes 55 and 55' and permit compressed air to act on plunger or piston 18' and force it down to uncover port 56 and cause valve 18 to cover the upper end of filling pipe 12. The compressed air will pass through the port 56 into the glass container or measuring vessel 8 and force out the gasolene down to the top of the three-gallon measuring tube 22 and out through valve 42 and the hose 44 to the car tank. At the time of so discharging from the measuring vessel 8 the valve 50 will also vent sub-tank 13 through its pipe 57 and the pipe 59. Exactly three gallons will be forced out of the container 8, because the gasolene can only pass out finally through the three-gallon tube 22, the top of which is in horizontal alinement with the three-gallon graduation on the container. The liquid level lies in the horizontal plane of the top of the measuring tube and the graduation on the glass container, owing to the universal mounting of the glass vessel.

The operation of the locking mechanism insuring the action of the odometer or counter 35 is as follows, taking the steps just described in connection with measuring and discharging three gallons of gasolene as an example: First, the gear 33 is set at the zero point as in Fig. 6, which will bring the hole 81 directly under the pin 87 and so permit the pin to enter the hole and allow the handle 43' to be depressed to open the air valve 51, which will cause the compressed air to fill the glass vessel 8 with gasolene from sub-tank 13. This operation of the handle 43' downward would be impossible without first bringing the hole 81 into registry with the pin 87, since when out of registry any attempt to operate handle 43' downwardly would be prevented by the pin 87 striking the periphery of the wheel 80. The glass vessel having been filled as before described and the gear 33 turned to bring its numeral 3 opposite the pointer 37, which will bring the corresponding hole 82 into register with the lower pin 88, and so permit the raising of handle 43' to open the discharge valve 42 and air valve 51 to permit entrance of compressed air into glass vessel 8. Any attempt to raise the handle 43' to discharge the contents of the measuring vessel 8 without operating the counter will be frustrated by the pin 88 striking the periphery of the wheel 80 between the holes 82 and so preventing upward movement. A further action of the pin 88 unless in register with a hole 82 is to simultaneously prevent opening of the air passage to glass vessel 8 until the proper valve 25 has been opened by cam 27, which in the present case would be the valve of the three-gallon measuring tube 22.

It is necessary that the graduated gear 33 be limited in its throw so that it can only be rotated forwardly as far as the highest numeral and in the reverse movement as far as the zero point. To accomplish this I provide a stop lug 95 on the wheel 33 which coöperates in its opposite throws with a stop 96 on the framework. This reverse movement of the wheel 33 is allowed by the construction of the usual counters or odometers which have a slip in one direction.

It is obvious that various changes may be made in the above described construction without departing from the spirit of my invention.

What I claim is:

1. A liquid dispenser comprising a main tank, a measuring container or vessel, a universal joint connecting the lower end of the container with the top of the main tank, means for supplying the container from the main tank, and means for discharging the contents of the container.

2. A liquid dispenser comprising a main tank, a measuring container or vessel, a universal joint connecting the lower end of the container with the top of the tank, a supply pipe leading up from the tank through the universal connection into the said container, means for causing the liquid to flow upwardly through said pipe into the container, and means for discharging the contents of the container.

3. A liquid dispenser comprising a main tank having a socket on its top, a measuring container provided at its lower end with a ball turning in the socket, a supply pipe extending up from the main tank through said ball into the container, means for causing an upward flow through the said pipe to supply the container, and means for discharging the contents of the container.

4. A liquid dispenser comprising a main tank, a measuring container having a discharge outlet, a universal joint connecting the lower end of the container with the top of the tank, compressed air mechanism for forcing the liquid from the tank through said pipe into the container and from the container through its discharge outlet and valve mechanisms controlling the compressed air mechanism and the discharge outlet and movable with the container as it swings on its universal joint.

5. A portable liquid dispenser comprising a portable tank, a container having a universal pivotal connection with the tank, a supply pipe extending from the container down into the tank and weighted at its lower end to hold the container vertical, means for forcing the liquid through the supply pipe to the container, and means for discharging the contents of the container.

6. A portable liquid dispenser comprising a portable tank, a liquid container having a universal pivotal connection with the tank, a supply pipe extending from the container down into the tank and provided with a sub-tank at its lower end, means for forcing the contents of the sub-tank into the container, and means for discharging a measured quantity from the container.

7. A portable liquid dispenser comprising a portable tank, a container having a universal pivotal connection with the top of the tank, a supply pipe leading from the container down through said universal connection into the tank, a sub-tank on the lower end of the said pipe, an automatic valved inlet for the sub-tank, a compressed air supply connected with the sub-tank and with the container and a valve controlling said compressed air supply to first admit air to the sub-tank and upon closing the same admitting air to the container, and a valved discharge outlet for the container.

8. A portable liquid dispenser comprising a portable tank, a container having a universal pivotal connection with the tank top, a supply pipe leading from the upper end of the container down through the said connection into the tank and there provided with a sub-tank having an automatically operating inlet valve, a compressed air supply connected with the sub-tank and with the container, and a multi-way valve mechanism to admit air first to the sub-tank to fill the container with liquid, then to said container to discharge a measured quantity of liquid therefrom and in so doing shut off the air to the sub-tank.

9. A portable liquid dispenser comprising a portable tank, a container having a universal pivotal connection with the top of the tank, a supply pipe leading from the upper end of said container down through said pivotal connection into the tank and there provided with a sub-tank acting as a counterbalancing weight and having an automatic filling valve, a compressed air tank mounted on said portable tank, a multi-way air valve mounted to swing with the container. pipes connecting said air valve with the sub-tank, container and compressed air tank, and a discharge valve for the container to swing therewith and operatively connected with the air valve for simultaneous operation therewith.

10. A portable fluid dispenser, comprising a portable tank, a container, a universal pivotal connection between the container and the top of the tank, a supply tube leading down from the top of the container through the universal connection into the tank, means for forcing the liquid from the tank through said tube into the container, a valve to discharge the contents of the container and a discharge hose secured to the tank and having a looped portion between its point of attachment to the tank and the discharge valve to relieve the container of the pull of the hose in use.

11. A portable fluid dispenser comprising a portable tank, a container having a universal pivotal connection with the top of the tank and a filling pipe depending through said connection into the tank, and there having a sub-tank, a discharge valve mounted to swing with the container, a hose attached between its ends to the tank and having a looped inner end portion connected to said valve, an air tank mounted on the main tank, a pipe leading up therefrom, a multi-way air valve mounted to swing with the container and having a flexible or looped connection with the upper end of the air pipe, and pipes leading from the air valve to the sub-tank and the container, for the purposes described.

12. A fluid dispenser comprising a main tank, a measuring container thereabove, a supply pipe leading from the upper portion of the container down into the main tank, a sub-tank on the lower end of said supply pipe and of somewhat greater capacity than the measuring capacity of the container and having an automatic filling valve, means for discharging a measured quantity from the container, a multi-way compressed air valve having a supply pipe, discharge pipes leading from the air valve to the sub-tank and the container, and a vent pipe leading from the air valve to the main-tank; the ways or passages in said valve serving in one throw of the valve to connect the air inlet pipe with the sub-tank air pipe nad simultaneously vent the air pipe leading to the container and in the other throw of the valve serving to connect the air supply pipe with the air pipe leading to the container and simultaneously vent the air pipe leading to the sub-tank.

13. A fluid dispensing apparatus comprising a measuring container having filling means and an outlet valve mechanism to discharge predetermined quantities, graduated actuating means for said outlet valve mechanism, a counter operatively connected to the said valve actuating means, a main discharge valve to discharge the liquid leaving the said outlet valve mechanism, and a locking means connecting the main discharge valve with the actuating means of the counter to prevent opening of the main discharge valve until the outlet valve actuator is brought to the zero or starting point.

14. A fluid dispensing apparatus comprising a measuring container, means for supplying the container with liquid, a graduated series of valved outlets at different heights opening through the bottom of the container; the valve stems also extending through said bottom, a rotary valve actuator adapted to successively actuate the valve stems, a graduated hand wheel geared to the said actuator, a counter geared to the said hand wheel, a main discharge valve below the series of valved outlets to discharge the measured quantity therefrom, a disk on the axis of the hand wheel having recesses in its periphery, and a link pivoted to the handle of the main discharge valve and having a yoke straddling the disk and provided with a pin to engage the periphery of the disk and prevent opening of the main discharge valve until the pin registers with one of the said recesses.

15. A fluid dispenser comprising a measuring container, a filling pipe leading from a source of liquid supply to the said container, a compressed air supply leading to the source of liquid supply and to the container, a multi-way valve controlling this air supply and having an operating handle, a graduated series of measuring outlets at different heights opening at their lower ends through the bottom of the container, valves for the said outlets having their stems extending below said bottom, a rotary valve actuator adapted to successively actuate said stems, a shaft geared to said actuator and provided with a graduated hand wheel, a counter actuated from the hand wheel, a main discharge valve below the rotary valve actuator and having an operating handle operatively connected with the handle of the air valve, and a locking means between the hand wheel shaft and the handle of the main discharge valve to prevent actuation of the said valve and the air valve until the hand wheel is first brought to the zero or starting point, for the purposes set forth.

16. A fluid dispenser comprising a measuring container, a filling pipe leading from a source of liquid supply to the container, a compressed air supply leading to the source of liquid supply and to the container to first force liquid into the container and then force it out, a multi-way air control valve for said air supply provided with a handle, a graduated series of measuring outlets opening through the bottom of the container, valves for said outlets having stems extending below the container bottom, a rotary valve actuator having a projection or cam to successively actuate the valve stems and discharge a measured quantity of liquid, a counter, a shaft geared to the valve actuator and provided with a graduated hand wheel geared to the counter, a disk on the shaft having apertures or recesses in its periphery, and a yoke straddling the disk and having opposite pins to engage the recesses or apertures in the disk; said yoke being operatively connected with the handle of the main discharge valve, for the purpose described.

17. In a liquid dispenser, a measuring container having a liquid supply, a series of measuring tubes of different heights opening through the bottom of the container, valve seats at the upper ends of the tubes, valves seating downwardly on said seats and having depending stems extending below the bottom of the container, a rotary plate having a projection or cam on its upper face to successively engage the lower ends of said valve stems, and a graduated hand wheel having a shaft geared to said rotary plate.

18. In a liquid dispenser, a measuring container having a liquid supply, a series of measuring tubes of different heights opening through the bottom of the container, valve seats at the upper ends of the tubes, valves seating downwardly on said seats and having depending stems extending below the bottom of the container, a rotary plate having a projection or cam on its upper face to successively engage the lower ends of said valve stems, a graduated hand wheel having a shaft geared to said rotary plate, and a counter actuated from said hand wheel.

19. A dispensing apparatus comprising a main tank having a socket in its top, a ball mounted to turn freely in said socket, a container having its lower portion permanently secured to the ball to rock therewith, a filling pipe leading from the top of the container down through the ball into the lower portion of the tank and there having a counterbalancing weight, means for forcing liquid up through the filling pipe into the container, and means for discharging measured quantities of liquid from the container.

20. A dispensing apparatus comprising a measuring container having a liquid supply pipe and a discharge valve, a compressed air pipe leading into the container adjacent to the end of the liquid supply pipe and having a lateral port, a piston in the end of the air pipe controlling said port and having a stem provided with a valve to close the end of the liquid supply pipe when the port is opened to admit air into the container.

21. A dispensing apparatus comprising a measuring container, a vertical liquid supply pipe leading to the upper end of the container, a discharge mechanism at the lower end of the container, a compressed air pipe entering the upper end of the container and provided with a depending end in alinement with the upper end of said supply pipe and having a lateral port, a piston valve controlling said port and having therebelow a valve to close the upper end of the supply pipe when the piston valve is forced down to opening said port.

22. A dispensing apparatus comprising a measuring container having an inlet for the fluid to be dispensed, means for effecting the discharge of a measured quantity of fluid from the container, a compressed air supply pipe leading into the container, and a compressed air controlled valve mechanism simultaneously controlling said fluid and air inlets to successively close the liquid inlet to entrance of compressed air and open the air inlets.

23. A dispensing apparatus comprising a measuring container having an inlet for the fluid to be dispensed, means for effecting the discharge of a measured quantity of fluid from the container, a compressed air supply pipe leading into the container, and a compresed air controlled valve mechanism simultaneously controlling said fluid inlet and air supply pipe to successively close the liquid inlet and open the air inlet, a main compressed air valve controlling the air supply to the pipe leading to the container, said main compressed air valve being operatively connected with the main discharge valve mechanism of the container.

In testimony whereof I affix my signature.

WILLIAM S. TOWNSEND.